United States Patent                                                         [11] 3,622,531

| [72] | Inventors | Alio J. Buselli<br>Livingston;<br>Charles E. Blades, Berkeley Heights; Louise<br>Speers Croix, Summit, N.J.; Sidney<br>Ariemma, Fishkill, N.Y. |
|---|---|---|
| [21] | Appl. No. | 162,981 |
| [22] | Filed | Dec. 28, 1961 |
| [45] | Patented | Nov. 23, 1971 |
| [73] | Assignee | Air Products and Chemicals, Inc.<br>Allentown, Pa.<br>Continuation of application Ser. No.<br>583,623, May 9, 1956, now abandoned.<br>This application Dec. 28, 1961, Ser. No.<br>162,981 |

[54] STABLE AQUEOUS VINYL ACETATE POLYMER EMULSIONS AND PROCESS FOR PREPARING SAME
21 Claims, No Drawings

[52] U.S. Cl. .................................................. 260/29.6,
260/17, 260/17.4, 260/85.7, 260/89.1
[51] Int. Cl. .................................................. C08f 1/13,
C08f 3/56

[50] Field of Search ........................................... 260/29.6

[56] References Cited
UNITED STATES PATENTS

| 2,413,197 | 12/1946 | Smith et al. | 260/29.6 |
|---|---|---|---|
| 2,587,562 | 2/1952 | Wilson | 260/89.1 |
| 2,769,712 | 11/1956 | Wilson | 260/29.6 |
| 2,828,224 | 3/1958 | Alps et al. | 260/29.6 |
| 2,956,973 | 10/1960 | Holdsworth | 260/17 |
| 3,112,282 | 11/1963 | Jones | 260/17 |

Primary Examiner—James A. Seidleck
Attorneys—David T. Nikaido and B. Max Klevit

ABSTRACT: There are disclosed vinyl ester polymer emulsions containing at least two nonionic, polyoxyethylene condensate emulsifying agents, at least one of which is relatively hydrophillic and at least one of which is relatively hydrophobic. Prior to polymerization the monomer emulsion is homogenized, preferably in contact with an emulsion polymerization catalyst. The hydrophillic, nonionic emulsifying agents have a cloud point above about 190° F. while the hydrophobic, nonionic emulsifying agents have a cloud point between about 80° and 160° F. The cloud points are determined in a 1 percent aqueous solution.

STABLE AQUEOUS VINYL ACETATE POLYMER EMULSIONS AND PROCESS FOR PREPARING SAME

This application is a continuation of our coapplication, Ser. No. 583,623, filed May 9, 1956, abandoned.

This invention relates to the preparation of vinyl ester polymer emulsions useful for forming coatings and films. The invention includes both novel vinyl ester monomer and polymer emulsions and the process of preparing the same.

One of the most important properties of vinyl ester polymer emulsions or water base coating compositions is their ability to withstand water and scrubbing. Previous vinyl ester polymer water base coating compositions and poor water scrub resistance primarily because of the large amount of protective colloid or dispersing agent found necessary to obtain a stable polymer dispersion. Attempts to decrease the amount of the protective colloid employed to improve the water and scrub resistance have heretofore been unsuccessful because it resulted in coagulation or "cheesing" of the polymer emulsion.

The preparation of the vinyl ester polymer emulsions of this invention generally comprises the formation of a vinyl ester monomer aqueous emulsion containing a mixture of at least two nonionic emulsifying agents consisting of at least one relatively hydrophilic nonionic emulsifying agent and at least one relatively hydrophobic nonionic emulsifying agent. The vinyl ester monomer emulsion is homogenized to reduce substantially all of the monomer (i.e., at least 99 percent) to a droplet size below about 10 microns. The homogenized monomer emulsion is then polymerized, preferably with the addition of a catalyst, while being moderately agitated and the pH of the resulting polymer emulsion regulated by the addition of a suitable alkali.

In accordance with this invention, vinyl ester polymer emulsions can be formed without the addition of a protective colloid, or with a decreased amount of protective colloid, which are stable emulsions and from which films can be formed possessing improved water and scrub resistance.

The advantages of the vinyl ester polymer emulsions of this invention result from the combination of the processing steps used to prepare them rather than in any one particular individual step. The homogenization of the vinyl ester monomer prior to polymerization to reduce substantially all of the monomer to a droplet size below about 10 microns in conjunction with the mixture of nonionic emulsifying agents as herein described are most important. These steps also in turn permit the use of lower polymerization temperatures, permit a more efficient use of the polymerization catalyst, and eliminate the necessity for vigorous agitation of the emulsion during the polymerization reaction. All of these factors, among others, contribute to the production of the improved vinyl ester polymer emulsions of this invention.

The emulsifying agents used to prepare the monomer and polymer vinyl ester emulsions of this invention are nonionic. The mixture comprises at least one nonionic emulsifying agent which is relatively hydrophobic and at least one nonionic emulsifying agent which is relatively hydrophilic. A relatively hydrophobic nonionic emulsifying agent is defined as one having a cloud point in a 1 percent aqueous solution of between about 80° and 160° F. A relatively hydrophilic nonionic emulsifying agent is defined as having a cloud point in a 1 percent aqueous solution of above about 190° F. All cloud points herein referred to refer to the cloud points in a 1 percent aqueous solution.

The surface tension of the aqueous reaction medium is also an important factor in the formation of the vinyl ester polymers of this invention. We have found that the surface tension of the water in the monomer emulsion should be maintained between about 28 to about 40 dynes per centimeter. The combination or mixture of emulsifying agents chosen should also produce a surface tension within the above range. A surface tension of between about 28 to 32 dynes per centimeter is most advantageous.

Different nonionic emulsifying agents having the above hydrophobic or hydrophilic properties may be used to form the combination emulsifying agents used in accordance with this invention. The nonionic emulsifying agents which can be used include polyoxyethylene condensates. Polyoxyethylene condensates may be represented by the general formula:

$$R + CH_2 - CH_2 - O +_n H$$

where R is the residue of a fatty alcohol containing 10–18 carbon atoms, an alkyl phenol, a fatty acid containing 10–18 carbon atoms, an amide, an amine, or a mercaptan, and where $n$ is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thioether.

The nonionic emulsifying agents which can be used according to this invention also include a series of surface active agents known as "Pluronics." The "Pluronics" have the general formula:

$$HO (C_2H_4O)_a (C_3H_6O)_b (C_2H_4)_c H$$

where $a$, $b$, and $c$ are integers of 1 or above. As $b$ increases, the compounds become less water soluble or more oil soluble and thus more hydrophobic when $a$ and $c$ remain substantially constant.

Some examples of relatively hydrophobic and relatively hydrophilic nonionic emulsifying agent combinations which can be used are as follows:

A relatively hydrophobic polyoxyethylene nonylphenyl ether having a cloud point of between 126° and 133° F., marketed under the trade name "Igepal CO-630" and a relatively hydrophilic polyoxyethylene nonylphenyl ether having a cloud point above 212° F., marketed under the trade name "Igepal CO-880."

A relatively hydrophobic polyoxyethylene oleyl ether having a cloud point of between 80° and 160° F., marketed under the trade name "Atlas G-3915" and a relatively hydrophilic polyoxyethylene lauryl ether having a cloud point above 190° F., marketed under the trade name "Brij 35."

A relatively hydrophobic polyoxypropylene having a cloud point of about 140° F., and marketed by Wyandotte under the trade name "Pluronic L-64," and a relatively hydrophilic polyoxypropylene having a cloud point of about 212° F., and marketed under the trade name "Pluronic F-68." "Pluronic L-64," is a polyoxyethylene-polyoxypropylene glycol conforming to the above general formula for "Pluronics" in which the polyoxypropylene chain has a molecular weight of 1,500 to 1,800 and the polyoxyethylene content is from 40 to 50 percent of the total weight of the molecule. "Pluronic F-68" is a polyoxyethylene-polyoxypropylene glycol conforming to the above general formula for "Pluronics" in which the polyoxypropylene chain has a molecular weight of 1,500 to 1,800 and the polyoxyethylene content is from 80 to 90 percent of the total weight of the molecule. The polyoxypropylene "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

A relatively hydrophilic polyoxyethylene nonylphenyl ether having a cloud point of about 212° F., marketed by the General Aniline and Film Corporation under the trade name "Igepal CO-880" and a relatively hydrophobic polyoxyethylene octylphenyl ether having a cloud point of between 80° and 160° F., marketed under the trade name "Triton x-100."

The concentration range of the total amount of the combined emulsifying agents useful according to this invention is from about 0.4 to 4.0 percent based on the aqueous phase of the emulsion regardless of the solid content. We have found that it is advantageous to maintain the total concentration of the combined emulsifiers between 0.8 and 2.4 percent based on the aqueous phase.

The concentration of the relatively hydrophobic emulsifying agent with respect to the relatively hydrophilic emulsifying agent or vice versa, can range between 25 to 75 percent of the total emulsifier concentration. For example, 25 percent of a relatively hydrophobic agent and 75 percent of a relatively hydrophilic agent or vice versa can be used. Intermediate relative concentrations are also operative. We have found that a relative concentration of approximately equal proportions of the hydrophobic component and the hydrophilic component is very dangerous.

The use of more than two emulsifiers having intermediate cloud points can also be used, but we have found that the use of more than two emulsifiers is not required.

It is advantageous to use a hydrophobic emulsifier having a cloud point between 120° and 150° F., and a hydrophilic component having a cloud point above 212° F.

The combination of nonionic emulsifying agents as described and used herein, in addition to contributing to the production of stable emulsions containing little or no protective colloid, also act synergistically. Excellent emulsions can be obtained with a lower total concentration of the combined nonionic emulsifying agents than would be required to produce a similar emulsion with only one emulsifying agent. The use of a single emulsifying agent, nonionic or otherwise, will not, however, result in the production of the improved emulsions and films of this invention.

The homogenization of the monomer mixture or dispersion can be accomplished by various devices well known to those skilled in the art. It is advantageous to effect the homogenization by a continuous flow process such as through a suitable gear or centrifugal pump with about 100 p.s.i. pressure in the exit line and ejected through a one-sixteenth inch nozzle to impinge on the bottom of a stainless steel vessel containing the bulk of the monomer emulsion. Under these circumstances the homogenization time should be about 30 minutes or the equivalent of 5 to 6 passes through the pump, or until substantially all of the monomer is reduced to a droplet size below about 10 microns and advantageously under about 6 microns.

Other mechanisms which are capable of producing an equivalent result, such as a "Waring" blender, can be used to effect the homogenization of the monomer emulsion. Impingement of the monomer emulsion upon the blades of a "Waring" blender for about 5 to 10 minutes has been generally found to effect homogenization of the monomer emulsion.

Various vinyl ester monomers can be polymerized according to this invention to produce vinyl ester polymer emulsions including vinyl esters of aliphatic carboxylic acids such as vinyl acetate, vinyl propionate, vinyl butyrate, vinyl 2-ethylhexoate, vinyl stearate, vinyl pelargonate, vinyl formate and the like. Copolymers can also be formed using two different vinyl esters. Some examples of copolymers include vinyl acetate-vinyl stearate in which the weight ratio of one monomer to the other may vary from 5–95 percent, and preferably the vinyl ester of the higher fatty acid represents from 10–30 percent by weight of the copolymer. Vinyl esters can also be copolymerized with a dialkyl ester of an alpha, betaunsaturated dicarboxylic acid, such as dialkyl maleates, dialkyl fumarates and the like, e.g., dibutyl maleate and dibutyl fumarate. In such copolymers the dialkyl ester of the unsaturated dicarboxylic acid can represent from 10–40 percent by weight of the copolymer and advantageously from 15–30 percent by weight. Other examples of copolymers which can be formed from two or more different vinyl esters include vinyl acetate-vinyl stearate-dibutyl maleate, vinyl acetate-vinyl stearate-dioctyl maleate and the like.

The term monomer as used herein includes one or more polymerizable compounds, such as vinyl acetate, and the term comonomer refers to at least one additional monomer capable of being copolymerized therewith, such as vinyl stearate or dibutyl maleate. The term polymer as used herein includes one or more polymerized monomers such as polyvinyl acetate, and the term copolymer includes at least two or more polymerized monomers such as vinyl acetate-vinyl stearate copolymer.

This invention is particularly advantageous when vinyl ester comonomers are copolymerized especially where the diffusion rates of the monomers are greatly different as in the vinyl acetate-vinyl stearate system.

The total solids content of the vinyl ester polymers in the emulsion can be varied within fairly wide limits and still maintain the advantages of the emulsions, films, and process of this invention. We have generally found that polymer emulsions containing 25 to 55 percent solids can be satisfactorily prepared by this method. The polymer emulsions of this invention can be easily thinned by the addition of water to a solids content of 6 percent and below.

Various catalysts can be used in carrying out the polymerization of the vinyl esters according to this invention, such as peroxide compounds. The invention includes the use of the combination type catalysts employing both reducing agents and oxidizing agents. This type of combined catalyst is generally referred to in the art as "redox polymerization" or "redox system." The reducing agent is also often referred to as an activator and the oxidizing agent as an initiator. Suitable reducing agents or activators include bisulfites, sulfoxylates or other compounds having reducing properties such as ferrous salts, and tertiary aromatic amines, e.g., N,N-dimethyl aniline. The oxidizing agents or initiators include hydrogen peroxide, organic peroxides such as benzoyl peroxide, t-butyl hydroperoxide and the like, persulfates, perborates and the like. Specific combination type catalysts or redox systems which can be used include hydrogen peroxide and zinc formaldehyde sulfoxylate; hydrogen peroxide or ammonium, or potassium persulfate with sodium metabisulfite, sodium bisulfite, ferrous sulfate, dimethylaniline, zinc or sodium formaldehyde sulfoxylate. Other types of catalysts that are well known in the art can also be used to polymerize the vinyl esters according to this invention such as the peroxide compounds with or without the addition of reducing agents or other activating materials.

We have also found that it is advantageous to utilize a more oil soluble hydroperoixde such as t-butyl hydroperoxide instead of the more water soluble peroxides, such as hydrogen peroxide in the redox system, to catalyze the vinyl ester polymerization of this invention. The use of such slightly oil soluble catalysts significantly reduces the tendency of clustering, especially at the final stage of conversion. This advantage of the more oil soluble catalysts is especially apparent when polymerizing unprotected emulsions or emulsions free of protective colloids.

Low temperature filming aids or plasticizers can also be used with the vinyl esters used to form the emulsions of this invention. The particular plasticizer used will of course depend upon the vinyl ester being polymerized. Some examples of plasticizers which can be used are diethyl phthalate and hexylene glycol. Other well-known plasticizers can also be used. Further improvement in the unprotected emulsions of this invention is obtained by incorporating low temperature filming aids or plasticizers therewith such as diethyl phthalate. The use of plasticizers gives a marked improvement in the mechanical stability of the emulsions and aids significantly in the formation of crack-free films at low temperatures. The use of diethyl phthalate with vinyl ester copolymers such as vinyl acetate-vinyl stearate and vinyl acetate-dibutyl maleate has been found to be particularly advantageous.

This invention includes stable vinyl ester polymer emulsions or dispersions without protective colloids and the process of making the same. The unprotected emulsions are stable and films formed therefrom have improved water and scrub resistance. The emulsions also contain small amounts of emulsifying agents when prepared according to this invention.

This invention also includes stable vinyl ester polymer emulsions or dispersions which contain colloids. Since the emulsions of this invention are stable without protective colloids, they are not used in a protective sense, but are used to control and increase the viscosity of the emulsions as thickeners to obtain emulsions for various uses where different and increased viscosities are desirable. The amount of colloid used is determined by the viscosity desired since the emulsions are stable independently of concentration colloid. It is thus possible to obtain stable vinyl ester polymer emulsions with a decreased amount of colloid and to add a colloid in the desired amount without regard to the stability of the emulsion. Stable vinyl ester polymer emulsions have been produced according to this invention having viscosities in the range of 50 to 1,500 centipoises and containing less than 1.5 percent colloid and less than 4 percent total emulsifier content. Various amounts of colloids can be incorporated into the emulsions as desired, but it is preferred to maintain the colloid concentration at the lowest level possible to insure a film with good water and scrub resistance and yet obtain the desired viscosity. The amount of colloid used will also depend upon the particular colloid employed. Colloids of higher molecular weight tend to produce an emulsion of a higher viscosity than like amounts of a lower molecular weight colloid. Other properties of the colloids aside from their molecular weight also affect the viscosity of the emulsions and also the properties of the films formed therefrom. We have found that it is advantageous to maintain the colloid content of the emulsions prepared according to this invention below about 1.5 percent by weight and that hydroxyethyl cellulose is a particularly advantageous colloid when used in the emulsions prepared according to this invention imparting unusually good properties to the polymer emulsions and to the films formed therefrom.

Various other colloids can also be used with the emulsions of this invention including polyvinyl alcohol, partially acetylated polyvinyl alcohol, hydroxyethyl starch, carboxymethyl cellulose, gum arabic and the like.

The improved vinyl ester monomer and polymer emulsions of this invention as described above are a result of the overall process including the homogenization of the monomer mixtures or dispersions and the use of the combined emulsifying agents as herein described and the several improved processing steps made possible by the homogenization and the combined emulsifying agents such as reduced agitation of the emulsion during the polymerization, reduced reaction or polymerization temperature, and reduced catalytic induction time and the amount of catalyst required.

By homogenizing the monomer mixtures or dispersions containing the combined emulsifying agents having the proper hydrophilic-hydrophobic balance and reducing the monomer droplet size to about 10 microns, practically a complete micellular structure is formed whereby the monomers are homogeneously distributed in the micelles which results in a monomer emulsion of improved stability.

The homogenization of comonomer mixtures or dispersions such as vinyl acetate-vinyl stearate and vinyl acetate-dibutyl maleate systems has been found to be particularly advantageous, especially when the diffusion rates of the monomers are greatly different as with vinyl acetate and vinyl stearate, for example. The homogenization of the monomer mixtures contributes markedly to the stability of both the monomer and polymer emulsions, the small particle size of the copolymers, and to the homogeneity of the copolymer emulsions.

In prior vinyl ester polymerization processes, vigorous or high speed agitation was essential. In the present process, once the monomer emulsions have been homogenized the need for vigorous or high speed agitation is eliminated thus also eliminating the tendency of the emulsions to foam and become aerated. We have also found that it is advantageous to maintain the original size and size distribution of the homogenized monomer droplets constant during the reaction, and any agitation which significantly alters the size and distribution of the droplets is to be avoided. Thus moderate agitation not only eliminates the disadvantages of high speed agitation, but is in itself a definite advantage in the particular process of this invention. The agitation rate used is therefore that which will not significantly alter the monomer droplet size and distribution but which is sufficient to insure an adequate distribution of the catalyst in the emulsion, and facilitate the dissipation of the heat generated by the reaction. Generally we have found that an agitation rate of about 250–300 r.p.m. with conventional dual paddle blades is sufficient and advantageous.

Lower reaction temperatures for polymerizing vinyl ester monomers than has heretofore been possible can also be used in the process of this invention. The use of lower reaction temperatures has been found to result in higher molecular weight vinyl ester polymers and to give a negligible amount of crosslinking in the polymer. The reaction temperature can be controlled by the rate of catalyst addition and by the rate of the heat dissipation therefrom. Generally we have found that it is advantageous to maintain a mean temperature of about 50° C., during the polymerization of the vinyl esters and to avoid temperatures much in excess of 60° C.

The reaction time will also vary depending upon other variables such as the temperature, the catalyst, and the desired extent of the polymerization. It is generally desirable to continue the reaction until less than 0.5 percent of the monomer remains unreacted. Under these circumstances, a reaction time of about 5 hours has been found to be generally sufficient for complete polymerization, but reaction times ranging from 1 to 12 hours have been used.

The induction time of the redox catalytic systems referred to above can also be materially reduced in the process of this invention. In prior vinyl ester polymerization processes long catalytic induction periods were necessary unless the polymerization was started at temperatures close to the boiling point of the vinyl ester. We have found that the homogenization of the monomer emulsions according to this invention produces a high activity even at low temperatures and that polymerization of the monomers with a minimum catalytic induction period can be accomplished even at temperature below room temperature. This has a pronounced effect on the stability of the final polymer emulsion and largely contributes to the development of the stable vinyl ester polymer emulsions of this invention containing little or no protective colloid. The efficient use of the catalyst also reduces the quantity needed, and the high temperature stability of the films formed from the emulsions is significantly improved.

The process of forming the vinyl ester polymer emulsions of this invention both with and without colloids generally comprises the preparation of an aqueous solution containing the mixture of emulsifying agents and then dispersing the vinyl ester monomer or comonomer throughout the prepared aqueous solution to form an emulsion. Other components can be added to the aqueous solution at the same time as the emulsifying agents such as a buffer and a colloid if the emulsion is to contain one. Plasticizers can also be mixed with the vinyl ester monomer and added to the aqueous solution at the same time. The prepared emulsion is then homogenized to reduce the droplet size of the monomer below about 10 microns and the homogenized emulsion transferred to a resin kettle where it is flushed with nitrogen while stirring at about 250–300 r.p.m. The emulsion is then heated to about 50° C. The initiator or oxidizing agent is added initially or incrementally, either prior to or after heating, and the activator or reducing agent is added as required while maintaining the emulsion under moderate agitation. The reaction is generally continued until the residual monomer content is below 0.5 percent. The completed reaction is allowed to cool to about room temperature while sealed form the atmosphere and an alkali added to adjust the pH to around 5.5 to 6.

Variations in the particular processing steps can, of course, be made by those skilled in the art without departing from the scope of this invention.

The following examples illustrate various embodiments of this invention. All parts recited therein are parts by weight.

Example 1.—Preparation of a Vinyl Acetate-Vinyl Stearate Copolymer Emulsion.

A vinyl acetate-vinyl stearate monomer solution was formed by dissolving 60 grams of vinyl stearate in 340 grams of vinyl acetate and allowing the solution to stand overnight. Sixteen grams diethyl phthalate was then added to the monomer mix.

An aqueous solution was then prepared by dispersing 6 grams of a relatively hydrophilic polyoxyethylene nonylphenyl ether having a cloud point of about 212° F. and marketed under the trade name "Igepal CO–880" and 6 grams of a relatively hydrophobic polyoxyethylene nonylphenyl ether having a cloud point of between about 126°–133° F. and marketed under the trade name "Igepal CO–630" in 320 grams of water with gradual heating for about 2 hours. The aqueous solution thus prepared was allowed to stand overnight.

The monomer mix was dispersed throughout the aqueous solution containing the emulsifying agents. The monomer dispersion thus prepared was homogenized by a continuous flow process by passing it through a Viking gear pump with 100 p.s.i. pressure in the exit line and ejecting it through a one-sixteenth inch nozzle and causing the dispersion stream to impinge on the bottom of a stainless steel or glass vessel containing the bulk of the monomer dispersion. The dispersion was passed through the circulating pump for about 30 minutes, or the equivalent of 5 to 6 passes through the pump to reduce substantially all of the monomer to a droplet size below 10 microns.

The monomer emulsion thus prepared was then transferred to a resin kettle and flushed with purified nitrogen for 1 hour while stirring with dual propeller blades between about 250–300 r.p.m.

0.8 ml. of t-butyl hydroperoxide was then added to the monomer emulsion and the emulsion heated with a water bath to 50° C. One milliliter portions of an activator solution comprising an aqueous solution containing 1 percent sodium formaldehyde sulfoxylate marketed under the trade name "Rongalite CX" were added at 5 minute intervals until the reaction was initiated. The bath temperature was reduced to 42°–44° C. and 1 ml. portions of the activator solution added at a rate which maintained the reaction temperature at 50° C. At the point where heat ceased to be produced, 0.1 ml. of t-butyl hydroperoxide was added and the addition of the activator solution continue until the residual monomer content was less than 0.5 percent. The reaction was completed in 5 hours. The reaction product was allowed to cool to room temperature in the resin kettle. Five milliliters of a 5 percent solution of sodium bicarbonate was then added to adjust the pH to about 5.5.

Wet films of the resulting product exhibited a pink to blue coloration, and these dried rapidly to a clear colorless film. The resulting polymer emulsion had a viscosity between 20–30 cps. under standard conditions, and a solids content between 51–52 percent. The polymer emulsion exhibited excellent mechanical stability, aging and chemical stability. Films formed therefrom had good scrub resistance, water-spotting resistance, and adhesion.

Example 2.—Preparation of a Vinyl Acetate-Vinyl Stearate Copolymer Emulsion with a Colloid.

A vinyl acetate-vinyl stearate monomer solution was formed by dissolving 60 grams of vinyl stearate and 16 grams of diethyl phthalate in 340 grams vinyl acetate by allowing the monomer mix, together with the diethyl phthalate solvent, to stand overnight at room temperature.

An aqueous solution was then prepared by dispersing 4 grams of a relatively hydrophilic polyoxyethylene nonylphenyl ether having a cloud point of about 212° F. and marketed under the trade name "Igepal CO–880" and 4 grams of a relatively hydrophobic polyoxyethylene nonylphenyl ether having a cloud point about 126°–133° F. sold under the trade name "Igepal CO–630" together with 0.8 grams of hydroxyethyl cellulose having a viscosity of 7,000 cps. in a 4 percent aqueous solution at 25° C. and marketed under the trade name "Cellosize WP–300" in 325 grams of water by stirring and gradually heating for about 2 hours. The solution was allowed to stand overnight.

The monomer mix was disperse throughout the aqueous solution containing the emulsifying agents and the colloid to form the monomer dispersion. The monomer dispersion was then homogenized in a "Waring" blender until substantially all of the monomer was reduced to a droplet size less than about 10 microns. The time to complete the homogenization in the "Waring" blender was about 5 minutes.

The homogenized monomer emulsion thus prepared was then transferred to a resin kettle and flushed with purified nitrogen for 1 hour while stirring with a dual bladed propeller at 250–300 r.p.m. and polymerized in the same manner as described in example 1. The completed reaction was sealed from the atmosphere and allowed to cool to room temperature. Five milliliters of a 5 percent solution of sodium bicarbonate was then added to adjust the pH to about 5.5.

The resulting polymer emulsion was a white viscous liquid having a viscosity of 500 cps. at 25° C. and a solids content between 51–52 percent. The polymer emulsion exhibited excellent mechanical stability and aging, and films formed therefrom possessed good scrub resistance, water-spotting resistance and adhesion.

Example 3.—Preparation of a Vinyl Acetate-Vinyl Stearate Copolymer Emulsion with a Colloid.

A vinyl acetate-vinyl stearate monomer solution was formed by dissolving 60 grams of vinyl stearate in 340 grams of vinyl acetate and allowing it to stand overnight at room temperature.

An aqueous solution was then prepared by dispersing 4 grams of a relatively hydrophobic polyoxyethylene oleyl ether having a cloud point between 80° and 160° F. and marketed by the Atlas Powder Company under the trade name "Atlas G–3915"and 4 grams of a relatively hydrophilic polyoxyethylene lauryl ether having a cloud point above 190° F. and marketed under the trade name "Brij 35" together with 4 grams of a partially hydrolyzed (88 percent) polyvinyl acetate marketed under the trade name "Vinol PA–20" and 0.3 grams of acetic acid in 330 grams of water.

The vinyl acetate-vinyl stearate monomer mix was then dispersed throughout the aqueous solution containing the emulsifying agents and the protective colloid to form a monomer dispersion. The monomer dispersion was then homogenized sufficiently to reduce substantially all of the monomer to a droplet size below about 10 microns in a "Waring" blender and transferred to a resin kettle, flushed with purified nitrogen for 1 hour, and stirred with a dual bladed propeller between 250–300 r.p.m. to produce a monomer emulsion.

Seven milliliters of a 4 percent aqueous solution of hydrogen peroxide was stirred into the monomer emulsion which had been previously heated to 50° C. followed by periodic addition of between 40–50 ml. of a 1 percent aqueous solution of zinc formaldehyde sulfoxylate marketed under the trade name "Sulfoxite C" during a 5 hour period. Further 1 ml. additions of the hydrogen peroxide solution were made in order to reduce the monomer content below 0.5 percent. Ten milliliters of a 5 percent aqueous solution of sodium bicarbonate was added to the polymer emulsion after it had cooled to adjust the pH to about 5.5.

The resulting polymer emulsion exhibited excellent mechanical stability. The films formed from the emulsion were slightly opaque and exhibited good water resistance and scrub resistance.

Example 4.—Preparation of a Vinyl Acetate-Dibutyl Maleate Copolymer Emulsion with a Colloid.

A vinyl acetate-dibutyl maleate monomer solution was formed by dissolving 90 pounds of dibutyl maleate with 210 pounds of vinyl acetate. Twelve pounds of hexylene glycol were added to the monomer solution together with 72 cc. of acetic acid.

An aqueous solution was also prepared by dispersing 1.8 pounds of a relatively hydrophilic polyoxyethylene nonylphenyl ether having a cloud point of about 212° F. and marketed under the trade name "Igepal CO-880," 1.8 pounds of a relatively hydrophobic polyoxyethylene nonylphenyl ether having a cloud point of between 126° and 133° F. and marketed under the trade name "Igepal CO-630," together with 1.8 pounds of hydroxyethyl cellulose having a viscosity of 7,000 cps., in a 4 percent aqueous solution at 25° C. and marketed under the trade name "Cellulose WP-300" in 267 pounds of deionized water.

The above aqueous solution may be formed in any manner desired, but it is convenient to first dissolve the "Igepal" emulsifying agents in approximately 40 pounds of the warm water. The "Cellosize" colloid is added to the rest of the water in a kettle and stirred for about one-half hour. The "Igepal" emulsifying agent solution is then added to the kettle containing the colloid and the rest of the water.

The solution of the monomers, the hexylene glycol and the acid were then added to the aqueous solution containing the emulsifying agents and the colloid. The mixture was rapidly stirred at about 1,700 r.p.m. for 5 to 10 minutes to form a dispersion. The dispersion was then pumped into a reactor kettle by means of two pumps (one turbine and one gear) against an exit pressure of 100 p.s.i. to homogenize the dispersion and reduce substantially all of the monomer to a droplet size of below about 10 microns. The pumping time was about 10 minutes. The stable monomer emulsion produced after homogenization had a pH of about 4.6 and a viscosity of about 100 centipoises at room temperature.

The stable monomer emulsion was then agitated in the reaction kettle at 125 r.p.m. using two three-blade propellers, and while it was being agitated 120 cc. of t-butyl hydroperoxide was then added to the monomer emulsion and allowed to mix therein for approximately 5 minutes. Four-hundred cubic centimeters of an activator solution comprising a 5 percent solution of sodium formaldehyde sulfoxylate marketed under the trade name "Rongalite CX" were gradually added over a period of about 10 minutes. During the course of the reaction 1,700 additional cc. of the activator solution were added. The rate of addition of the activator solution was controlled so that the operating temperature was between 50° and 55° C. and was at no time allowed to exceed 60° C. When the temperature approached 60° C. the reaction was cooled with water. During the course of the reaction, 30 cc. of t-butyl hydroperoxide were added after 1½, 2½, and 3½ hours' reaction time. After 4½ hours' reaction time an additional 10 cc. portion of t-butyl hydroperoxide was added. The reaction was complete in about 5 hours. Agitation of the reaction mixture was continued throughout the entire reaction period at about 125 r.p.m. The absence of a sharp vinyl acetate odor indicated that the reaction was complete.

After the completed reaction had cooled to about 35° C., one-fourth pound of sodium bicarbonate dissolved in 8 pounds of water was added slowly to the stirred reaction product. After stirring for about 10 minutes, the copolymer emulsion was filtered through a double layer of cheese cloth and was ready for use or storage.

The resulting vinyl acetate-dibutyl maleate copolymer emulsion had a pH between 5 and 6, a solids content of about 51 percent, a viscosity of about 600 cps., and a residual monomer content of less than 0.8 percent. The copolymer emulsion also possessed good solvent tolerance and excellent mechanical stability. Films formed from the copolymer emulsion had excellent flexibility, scrub resistance, water-spotting resistance, and adhesion.

Example 5.—Preparation of a Vinyl Acetate-Dibutyl Maleate Copolymer Emulsion with a Colloid.

A vinyl acetate-dibutyl maleate monomer solution was formed by dissolving 3,75 pounds of dibutyl maleate with 21.25 pounds of vinyl acetate. 0.5 pounds of hexylene glycol were added to the comonomer solution and the solution dispersed throughout an aqueous solution containing 0.15 pounds of a relatively hydrophilic polyoxyethylene nonylphenyl ether having a cloud point of about 212° F. and marketed under the trade name "Igepal CO-880," 0.15 pounds of a relatively hydrophobic polyoxyethylene nonylphenyl ether having a cloud point of between about 126°-133° F. and marketed under the trade name "Igepal CO—630," and 0.15 pounds of hydroxyethyl cellulose in 22 pounds of water and the emulsion homogenized as described in example 1.

The stable homogenized emulsion was then charged into a reactor which had previously been purged with nitrogen, the temperature raised to 48° C. and the emulsion agitated with paddles at about 250–300 r.p.m.

Twenty milliliters of t-butyl hydroperoxide was then added and allowed to mix into the emulsion for about 5 minutes. Thirty milliliters of an activator solution comprising an aqueous solution containing 2 percent sodium formaldehyde sulfoxylate and 1 percent anhydrous sodium acetate was then added. Fifteen milliliter portions of the activator solution was then added over a period of about 15 minutes until the reaction was initiated. After the initial reaction had subsided, the activator solution was added continuously at the rate of 30 ml. per hour until the polymerization was completed. When the exothermic reaction ceased, an additional 5 ml. portion of t-butyl hydroperoxide was added and the rate of addition of the activator solution doubled until the monomer content fell below 0.5 percent. The cooling rate was adjusted throughout the reaction to maintain a mean temperature of 50° C. The temperature at no time exceeded 55° C. The moderate agitation between 250–300 r.p.m. was continued throughout the reaction.

The reaction product was then cooled to about 35° C. and while stirring was neutralized with 0.5 pounds of a 5 percent sodium bicarbonate solution to adjust the pH of the emulsion to about 6.

The resulting emulsion had a viscosity of 750 centipoises and a solids content of 51 percent. The polymer emulsion had excellent mechanical stability and films formed therefrom possessed good water and scrub resistance.

Example 6.—Preparation of a Vinyl Acetate-Dibutyl Maleate Copolymer Emulsion.

A vinyl acetate-dibutyl maleate monomer solution was formed by dissolving 5 pounds of dibutyl maleate with 20 pounds of vinyl acetate. The comonomer solution was dispersed throughout an aqueous solution containing 0.375 pounds of a relatively hydrophilic polyoxyethylene nonylphenyl ether having a cloud point of about 212° F. and marketed under the trade name "Igepal CO-880," 0.375 pounds of a relatively hydrophobic polyoxyethylene nonylphenyl ether having a cloud point of between about 126°–133° F. and marketed under the trade name "Igepal CO–630,"b and 21.75 pounds of water.

The monomers were dispersed in the aqueous solution by rapid agitation. This unstable monomer dispersion was then homogenized in an atmosphere of nitrogen as described in example 1 and charged into a reactor which had been previously purged with nitrogen. The emulsion was then stirred at 250–300 r.p.m. and the temperature raised to 48° C.

Twenty milliliters of t-butyl hydroperoxide were added to the homogenized emulsion and allowed to mix into the emulsion. Thirty milliliters of an activator solution comprising an aqueous solution containing 2 percent sodium formaldehyde sulfoxylate and 1 percent anhydrous sodium acetate was then added. Fifteen milliliters portions of the activator solution was then added during a 15 minute interval until the reaction was initiated. After the initial reaction subsided, the activator solution was added continuously at a rate of 60 ml. per hour until polymerization was completed. When the exothermic reaction subsided, an additional 5 ml. portion of t-butyl hydroperoxide was added, and the activator solution addition rate doubled until the monomer content fell below 0.5 percent. The temperature throughout the reaction at no time exceeded 55° C. and was maintained at a mean temperature of 50° C. The stirring rate of 250–300 r.p.m. was maintained throughout the reaction.

The polymer emulsion was then cooled to 35° C. while stirring and the pH adjusted to 6 by adding 0.5 pounds of a 5 percent solution of sodium bicarbonate.

Films formed from the polymer emulsion exhibited excellent water and scrub resistance.

Other vinyl esters, such as vinyl acetate alone, and copolymers of vinyl esters, as herein described, can be prepared in a similar manner to the above examples.

We claim:

1. A process for forming a stable aqueous vinyl acetate polymer emulsion which comprises homogenizing an aqueous emulsion containing vinyl acetate monomer in the presence of at least two nonionic emulsifying agents, each of said emulsifying agents being selected from the group consisting of polyoxyethylene nonylphenyl ethers, polyoxyethylene octylphenyl ethers, polyoxyethylene lauryl ethers, polyoxyethylene oleyl ethers, and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion, until at least 99 percent of said monomer has a droplet size below about 10 microns, and polymerizing said monomer under emulsion polymerization conditions in contact with an emulsion polymerization catalyst.

2. A process for forming a stable aqueous copolymer emulsion which comprises homogenizing an aqueous emulsion containing vinyl acetate monomer and a monomer copolymerizable therewith selected from the group consisting of vinyl stearate and a dialkyl ester of an alpha, beta-ethylenically unsaturated dicarboxylic acid in the presence of at least two nonionic emulsifying agents, each of said emulsifying agents being selected from the group consisting of polyoxyethylene nonylphenyl ethers, polyoxyethylene octylphenyl ethers, polyoxyethylene lauryl ethers, polyoxyethylene oleyl ethers, and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion, until at least 99 percent of said monomer has a droplet size below about 10 microns, and polymerizing said monomer under emulsion polymerization conditions in contact with an emulsion polymerization catalyst.

3. A process for forming a stable aqueous vinyl acetate-vinyl stearate copolymer emulsion which comprises homogenizing an aqueous emulsion containing vinyl acetate and vinyl stearate monomers in the presence of at least two nonionic emulsifying agents, each of said emulsifying agents being selected from the group consisting of polyoxyethylene nonylphenyl ethers, polyoxyethylene octylphenyl ethers, polyoxyethylene lauryl ethers, polyoxyethylene oleyl ethers, and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion, until at least 99 percent of said monomer has a droplet size below about 10 microns, and polymerizing said monomer under emulsion polymerization conditions in contact with an emulsion polymerization catalyst.

4. A process for forming a stable aqueous copolymer emulsion which comprises homogenizing an aqueous emulsion containing vinyl acetate monomer and a dialkyl ester of an alpha, beta-ethylenically unsaturated dicarboxylic acid in the presence of at least two nonionic emulsifying agents, each of said emulsifying agents being selected from the group consisting of polyoxyethylene nonylphenyl ethers, polyoxyethylene octylphenyl ethers, polyoxyethylene lauryl ethers, polyoxyethylene oleyl ethers, and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion, until at least 99 percent of said monomer has a droplet size below about 10 microns, and polymerizing said monomer under emulsion polymerization conditions in contact with an emulsion polymerization catalyst.

5. The process of claim 4 in which the dialkyl ester of an alpha, beta-ethylenically unsaturated dicarboxylic acid is dibutyl maleate.

6. A process for forming a stable aqueous vinyl acetate polymer emulsion which comprises homogenizing an aqueous emulsion containing vinyl acetate monomer in the presence of at least two nonionic emulsifying agents, each of said emulsifying agents being a polyoxyethylene nonylphenyl ether, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being about 0.4 to about 4 percent based on the aqueous phase of said emulsion, until at least 99 percent of said monomer has a droplet size below about 10 microns, and polymerizing said monomers under emulsion polymerization conditions in contact with an emulsion polymerization catalyst.

7. A process for forming a stable vinyl acetate polymer emulsion which comprises homogenizing an aqueous emulsion containing vinyl acetate monomer in the presence of at least two nonionic emulsifying agents, the first of said nonionic emulsifying agents being a polyoxyethylene oleyl ether having a cloud point between about 80° and 160° F. and the second of said nonionic emulsifying agents being a polyoxyethylene lauryl ether having a cloud point above 190° F., each of said emulsifying agents constituting from 25 to 75 percent of the total amount of emulsifying agents, the total of said emulsifying agents having about 0.4 to about 4 percent based on the aqueous phase of said emulsion, until at least 99 percent of said monomer has a droplet size below about 10 microns, and polymerizing said monomers under emulsion polymerization conditions in contact with an emulsion polymerization catalyst.

8. A process for forming a stable vinyl acetate polymer emulsion which comprises homogenizing an aqueous emulsion containing vinyl acetate monomer in the presence of at least two nonionic emulsifying agents, each of said nonionic emulsifying agents being a polyoxyethylene-polyoxypropylene glycol, the first of said nonionic emulsifying agents having a cloud point between about 80° and 160° F., and the second of said nonionic emulsifying agents having a cloud point above 190° F., each of said emulsifying agents constituting from 25 to 75 percent of the total amount of emulsifying agents, the total of said emulsifying agents being about 0.4 to about 4 percent based on the aqueous phase of said emulsion, until at least 99 percent of said monomer has a droplet size below about 10 microns, and polymerizing said monomer under emulsion polymerization conditions in contact with an emulsion polymerization catalyst.

9. A stable aqueous vinyl acetate polymer emulsion comprising water, a polymer of vinyl acetate, and at least two nonionic agents, each of said emulsifying agents being selected from the group consisting of polyoxyethylene nonylphenyl ethers, polyoxyethylene octylphenyl ethers, polyoxyethylene lauryl ethers, polyoxyethylene oleyl ethers, and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion.

10. A stable aqueous vinyl acetate polymer emulsion comprising water, a polymer of vinyl acetate, and at least tow nonionic emulsifying agents, each of said emulsifying agents being a polyoxyethylene nonylphenyl ether, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion.

11. A stable aqueous vinyl acetate polymer emulsion comprising water, a polymer of vinyl acetate and at least two nonionic emulsifying agents, each of said emulsifying agents being a polyoxyethylene-polyoxypropylene glycol, the first of said nonionic emulsifying agents having a cloud point between about 80° and 160° F. and the second of said nonionic emulsifying agents having a cloud point of about 190° F., each of said emulsifying agents constituting from 25 to 75 percent of the total amount of emulsifying agents, the total of said emulsifying agents being from about 0.4 to about 4 percent based on the aqueous phase of said emulsion.

12. Process for the production of a latex of a vinyl acetate polymer, comprising polymerizing a vinyl acetate in an aqueous emulsion containing about 0.1 to 1.5 percent by weight of said emulsion of a water-soluble colloidal emulsifying agent and about 0.045 to about 2.25 percent by weight of said emulsion of a water-immiscible nonionic surface-active agent containing a polyalkylene oxide chain and compatible with the resulting vinyl acetate polymer, said water-immiscible surface-active agent containing a polymer of propylene oxide, and said emulsion also containing about 0.045 to about 2.25 percent by weight of said emulsion of a water-miscible surface-active agent.

13. A vinyl acetate polymer emulsion of polymerized resin-forming monomer selected from the group consisting of vinyl acetate and mixtures of vinyl acetate with up to 40 percent of said mixture of material polymerizable with vinyl acetate selected from the group consisting of dialkyl maleates and dialkyl fumarates having two to eight carbon atoms in the alkyl radicals and vinyl esters of alkanoic acids having three to 18 carbon atoms in the alkanoic group, and at least to nonionic emulsifying agents, the first of said emulsifying agents having a cloud point between about 80° and 160° F. and being a polyoxyethylene-polyoxypropylene glycol in which the polyoxypropylene chain has a molecular weight from 1,500 to 1,800 and the polyoxyethylene content is from 40 to 50 percent by weight of the total molecule which was present during the polymerization process, the second of said emulsifying agents having a cloud point above about 190° F. and being a polyoxyethylene-polyoxypropylene glycol in which the polyoxypropylene chain has a molecular weight from 1,500 to 1,800 and the polyoxyethylene content is from 80 to 90 percent by weight of the total molecule which was present during the polymerization process, each of said emulsifying agents constituting from 25 to 75 percent of the total amount of emulsifying agents, the total of said emulsifying agents being from about 0.4 to about 4 percent based on the aqueous phase of said emulsion.

14. A process for forming a stable aqueous vinyl acetate polymer emulsion which comprises homogenizing an aqueous emulsion containing vinyl acetate monomer in the presence of at least two nonionic emulsifying agents until at least 99 percent of said monomer has a droplet size below about 10 microns, each of said emulsifying agents being a polyoxyethylene condensate emulsifying agent, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion and polymerizing said monomer under emulsion polymerization conditions in contact with an emulsion polymerization catalyst.

15. A process for forming a stable aqueous vinyl acetate polymer emulsion which comprises homogenizing an aqueous emulsion containing vinyl acetate monomer in the presence of at least two nonionic emulsifying agents until at least 99 percent of said monomer has a droplet size below about 10 microns, each of said emulsifying agents being selected from the group consisting of polyoxyethylene alkyl phenyl ethers, polyoxyethylene ethers of fatty alcohols of 10 to 18 carbon atoms and polyoxyethylene-polyoxypropylene glycols, the first of said nonionic emulsifying agents having a cloud point between about 80° and 160° F., and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion, and polymerizing said monomer under emulsion polymerization conditions in contact with an emulsion polymerization catalyst.

16. A process for forming a stable aqueous polymer emulsion which comprises homogenizing an aqueous emulsion containing vinyl acetate monomer and a monomer copolymerizable therewith selected from the group consisting of vinyl esters of aliphatic monocarboxylic acids of three to 18 carbon atoms and dialkyl esters of alpha, beta-ethylenically unsaturated dicarboxylic acids in the presence of at least two nonionic emulsifying agents until at least 99 percent of said monomer has a droplet size below about 10 microns, each of said emulsifying agents being a polyoxyethylene condensate emulsifying agent, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion and polymerizing said monomer under emulsion polymerization conditions in contact with an emulsion polymerization catalyst.

17. A process for forming a stable aqueous polymer emulsion which comprises homogenizing an aqueous emulsion containing vinyl acetate monomer and a monomer copolymerizable therewith selected from the group consisting of vinyl esters of aliphatic monocarboxylic acids of three to 18 carbon atoms and dialkyl esters of alpha, beta-ethylenically unsaturated dicarboxylic acids in the presence of at least two nonionic emulsifying agents until at least 99 percent of said monomer has a droplet size below about 10 microns, each of said emulsifying agents being selected from the group consisting of polyoxyethylene alkyl phenyl ethers, polyoxyethylene ethers of fatty alcohols of 10 to 18 carbon atoms and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion, and polymerizing said monomer under emulsion polymerization conditions in contact with an emulsion polymerization catalyst.

18. A stable aqueous vinyl acetate polymer emulsion comprising water, a polymer containing polymerized vinyl acetate, and at least two nonionic emulsifying agents, each of said emulsifying agents being a polyoxyethylene condensate emulsifying agent, the first of said nonionic emulsifying agents having a cloud point between about 80° and 160° F. and the second of said nonionic emulsifying agents having a cloud point above about 190° F., each of said emulsifying agents consisting from 25 to 75 percent of the total amount of emulsifying agents, the total of said emulsifying agents being from about 0.4 to about 4 percent based on the aqueous phase of said emulsion.

19. A stable aqueous vinyl acetate polymer emulsion comprising water, a polymer containing polymerized vinyl acetate, and at least two nonionic emulsifying agents, each of said emulsifying agents being selected from the group consisting of polyoxyethylene alkyl phenyl ethers, polyoxyethylene ethers of fatty alcohols of 10 to 18 carbon atoms and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion.

20. A stable aqueous vinyl acetate polymer emulsion comprising water, a copolymer of vinyl acetate and a monomer copolymerizable therewith selected from the group consisting of vinyl esters of aliphatic monocarboxylic acids of three to 18 carbon atoms and dialkyl esters of alpha, beta-ethylenically unsaturated dicarboxylic acids and at least two nonionic emulsifying agents, each of said emulsifying agents being a polyoxyethylene condensate emulsifying agent, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion.

21. A stable aqueous vinyl acetate polymer emulsion comprising water, a copolymer of vinyl acetate, and a monomer copolymerizable therewith selected from the group consisting of vinyl esters of aliphatic monocarboxylic acids of three to 18 carbon atoms and dialkyl esters of alpha, beta-ethylenically unsaturated dicarboxylic acids and at least two nonionic emulsifying agents, each of said emulsifying agents being selected from the group consisting of polyoxyethylene alkyl phenyl ethers, polyoxyethylene ethers of fatty alcohols of 10 to 18 carbon atoms and polyoxyethylene-polyoxypropylene glycols, the first of said nonionic emulsifying agents having a cloud point between about 80° and 160° F. and the second of said nonionic emulsifying agents having a cloud point above about 190° F., each of said emulsifying agents constituting from 25 to 75 percent of the total amount of emulsifying agents, the total of said emulsifying agents being from about 0.4 to about 4 percent based on the aqueous phase of said emulsion.

* * * * *